United States Patent [19]

Smith et al.

[11] Patent Number: 4,888,843
[45] Date of Patent: Dec. 26, 1989

[54] HOLDER FOR ROTARY PAD

[75] Inventors: Ronald J. Smith, Carol Stream; Thomas J. Lerch, Chicago; Rick McLeod, Lake In The Hills, all of Ill.

[73] Assignee: Hako Minuteman, Inc., Addison, Ill.

[21] Appl. No.: 263,179

[22] Filed: Oct. 27, 1988

[51] Int. Cl.$^4$ .............................................. A47L 11/14
[52] U.S. Cl. .................................... 15/98; 15/230.19; 15/242; 51/378; 403/361; 411/510; 411/913
[58] Field of Search ............... 15/98, 49 R, 50 R, 246, 15/230.19, 230; 403/361; 51/378; 411/339, 508–510, 512, 913

[56] References Cited

U.S. PATENT DOCUMENTS

| | | | |
|---|---|---|---|
| 3,757,378 | 9/1973 | Wakefield | 15/230.19 |
| 4,365,377 | 12/1982 | Todd et al. | 15/98 |
| 4,541,207 | 9/1985 | Antonson | 51/376 |
| 4,662,024 | 5/1987 | Moensch | 15/230.19 |
| 4,826,379 | 5/1989 | Norden | 411/512 |

OTHER PUBLICATIONS

Page 504 from *Engineering Drawing & Graphic Technology*, 12th Ed., by Thomas E. French and Charles J. Vierck.

Pages 1326–1327 from *Machinery's Handbood*, 22nd revised Ed., from Industrial Press.

*Primary Examiner*—Edward L. Roberts
*Attorney, Agent, or Firm*—Emrich & Dithmar

[57] ABSTRACT

Apparatus for mounting a pad to a rotary floor machine includes an internally threaded drive collar mounted in coaxial relation with a drive shaft. The teeth of the thread on the collar have a sawtooth profile with an inclined lead-in surface and a holding surface. A retainer member in the form of a flanged collar has a cylindrical insert with a plurality of tabs capable of flexing inwardly. The flex tabs are spaced about the insert and have external thread segments, the teeth of which also have a sawtooth profile, for matching engagement with the internal threads of the drive collar. The retainer insert is assembled by pushing it into the drive collar. The lead-in surfaces of the matching threads cam the flex tabs inwardly during assembly so that the sawtooth threads ride over one another. The radial holding surfaces engage to provide substantial holding force for the center of the pad which is clamped between the flanges of the drive collar and the retainer member.

4 Claims, 3 Drawing Sheets

HOLDER FOR ROTARY PAD

FIELD OF THE INVENTION

The present invention relates to apparatus for securing a pad to a rotary floor machine of the type used in floor care and maintenance. The invention may be adapted, for example, to buffing, burnishing, polishing, scrubbing or other cleaning or maintenance types of rotary pad machines, collectively referred to herein as "rotary floor care machines" The pad holder of the present invention has particular usefulness in a floor care machine having a center caster, such as is disclosed in co-owned U.S. Pat. No. 4,365,377.

Current commercially available pads used in rotary floor care machines are of a loosely entwined synthetic material, such as polyester. Machine operation is being extended to higher speeds; and there is a tendency for the pad material to "creep" outwardly due to its construction. This tendency is inhibited by uniformly gripping the upper surface of the pad with a gripper member having projections which extend into one surface, and by providing an aperture in the center of the pad so that it is received on a "pad holder". The function of the pad holder is to firmly grip the central portion of the pad surrounding the aperture, but it must permit the pad to be replaced. It would also be desirable to permit the operator to tighten the pad holder since even the center portion of the pads beneath the pad holder have a tendency to creep out from beneath the pad holder during operation, especially at high speeds. Pad replacement typically may occur every four hours in the case of a high speed floor burnisher.

Examples of current commercially available pad holders are disclosed in U.S. Pat. Nos. 4,541,207 and 4,662,024. In the former patent, the pad holder apparatus has a split ring retainer, and it is not adapted to accommodate pads of different thicknesses. Moreover, that arrangement has finger tabs extending inwardly of the central collar of the retainer and any such inwardly extending tabs might interfere with the operation of the center caster in the type of machine referred to above or the presence of the caster may make it difficult to operate the tabs to remove the retainer. This structure also accommodates pads of only one thickness (or over a very limited range of thickness at best) and does not permit tightening of the pad holder. In the pad holder disclosed in U.S. Pat. No. 4,662,024, the center portion of the retainer member is also obstructed by inwardly extending tabs, and it has the further disadvantage that, in order to achieve the desired clamping pressure, the retainer member must be aligned to insert and then turned by hand to achieve a tightening action.

There are presently a wide range of thicknesses of pads available for use on commercial machines, and there is a desire to have the pad holder quickly and easily accommodate a pad of varying thicknesses. There is also a desire to facilitate changing of a pad by quickly and easily disassembling the pad holder, replacing a pad and re-assembling a pad holder without the need of tools. It would further be desirable to tighten the pad holder if "center creep" is observed—that is, if the pad begins to creep out from beneath the pad holder and thereby become thinner at the center.

SUMMARY OF THE INVENTION

The present invention includes a drive collar mounted in axial alignment with the drive shaft or drive member of a rotary polisher and having a continuous internal thread. In cross-section, the thread of the drive collar is in the form of a sawtooth or buttress-type thread, having an inclined lead-in surface which extends inwardly and axially of the collar so as to form a ramp-like or cam surface. At the inner end of the inclined surface, the thread has a generally flat surface (or "pressure flank") extending in a generally radial direction relative to the axis of the collar.

A retainer member in the form of a flanged collar has a cylindrical insert portion and an outwardly extending flange for clamping and securing the area surrounding the central aperture of the pad against a corresponding flange on the drive collar.

The insert of the retainer member and is adapted to be received in the drive collar. The retainer member has a plurality of tabs which are generally rectilinear in shape and have three sides cut free so that the fourth side, which connects the tab to the body of the retainer insert permits the tabs to flex inwardly. Each tab (sometimes referred to as a "flex tab") has on its inner surface a segment of a sawtooth thread for threaded engagement with the internal thread of the drive collar when assembled to it.

The retainer member may be assembled to the drive collar by pushing the insert axially into the drive collar. Inclined surfaces of the sawtooth threads cam the flex tabs of the retainer inwardly to ratchet over the fixed threads of the collar. The retainer member may then be turned to achieve an even tighter clamping action. The retainer member is removed in replacing the pad by unscrewing it, using finger recesses formed in the periphery of the flange.

The pad holder of the present invention provides good gripping action and ease of pad replacement. It also accommodates pads of different sizes over a wide range, and permits the pad holder to be tightened if the operator notices that the center of the pad is creeping. The present invention is also designed to accommodate a machine having a caster mounted in the center of the pad to equalize the weight of the machine during operation. Pad holders which have tabs or projections extending inwardly of the pad holder are likely either to interfere with the center caster of the type of machine described, or to present a difficulty in having finger access to the necessary tabs or projections in order to assemble or disassemble the pad holder. Thus, the present invention avoids any parts which extend into the center of the pad holder.

The present invention thus is designed to overcome the problems of the prior art in accommodating a pad holder to a center-caster type of machine, although the present invention may be used with other, more conventional types of machines since it also quickly and easily accommodates changing of a pad and conveniently accommodates itself to pads of different thicknesses within a range, while permitting a person changing a pad to achieve whatever gripping force is desired by permitting him to screw the retainer member into the drive collar as tightly as desired or necessary.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF THE PREFERRED EMBODIMENT

Figure 1:
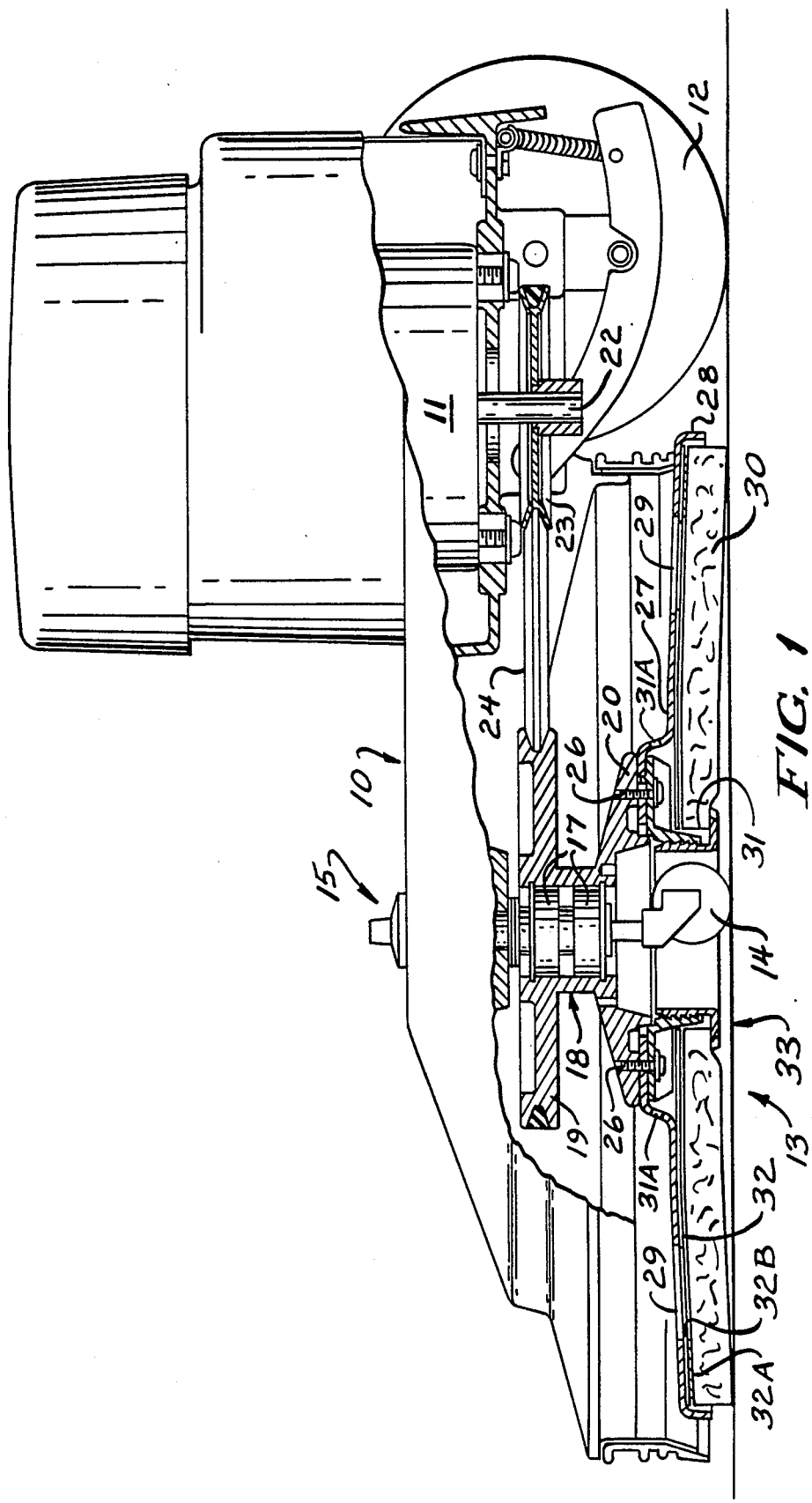
FIG. 1 is a left side view, partially broken away, to show the interior of the pad housing of a rotary floor care machine incorporating the present invention.

Referring then to FIG. 1, reference numeral 10 generally designates a housing of a rotary floor machine which includes an electric motor 11, two rear support wheels, one of which is shown at 12, a pad driver assembly generally designated 13 and a caster wheel 14 located at the center of the pad driver assembly. Additional details concerning the drive assembly and operation may be obtained from U.S. Pat. No. 4,631,775. However, in brief, the caster 14 is mounted as at 15 to the top of the housing 10 to space the pad driver assembly, which is also carried by the housing, relative to the surface of the floor being treated. A pair of bearings 17 are mounted within a casting generally designated 18, the top portion of which forms a pulley sheave 19, and the lower portion of which forms a mounting base 20 for the pad assembly, to be described. A bearing 17A (FIG. 2) permits the caster to pivot about a vertical axis, and bearings 17 permit sheave 19 (and casting 18) to rotate about the same axis.

The motor 11 has a drive shaft 22 to which is secured a pulley sheave 23. A belt 24 is entrained about the sheaves 19 and 23 for driving the pad assembly 13 in a rotary motion about an axis which is colinear with the axis of rotation of the caster wheel 14. Thus, the caster 14 supports the weight of the housing 10 about a vertical line which is colinear of the axis of rotation of the pad driver assembly so that a uniform downward force may be applied to the pad in a burnishing or polishing operation.

The pad assembly 13 is secured to the mounting base 20 of the casting 18 by means of bolts 26. The pad driver assembly includes a backing plate 27 provided with a downwardly extending peripheral skirt 28 and a series of apertures 29 spaced radially about an intermediate region of the backing plate 27. Beneath the backing plate 27 is a gripper member 32 and a pad 30 which has a central portion cut away to provide an opening 31 to receive the caster 14. The purpose of the skirt 28 as disclosed in U.S. Pat. No. 4,701,976 is to help in preventing the outer portion of the pad from creeping outwardly and is particularly useful in a high speed burnishing machine. The apertures 29 and 31A in the hub of the backing plate permit air to enter the pad and flow radially outwardly from the central part of the pad under centrifugal force, thereby providing a low pressure within the pad material itself due to centrifugal force and the high exit velocity of the air which creates a low pressure so that atmospheric pressure on the top of the backing plate forces the flexible backing plate downwardly so that it may engage the surface being treated uniformly throughout an outer peripheral region of the pad. The inner annular portion of the pad 30 immediately surrounding the opening 31 is clamped by means of a pad holder assembly generally designated 33.

A gripper member 32 located beneath the backing plate 27, is in the form of a flat plate with downwardly extending projections 32A for gripping the upper surface of the pad 30 to further assist in avoiding any slippage of the pad relative to the drive assembly and to resist any outward creep or deformation of the pad itself. The gripper member 32 is also provided with apertures 32B in registration with the apertures 29 of the backing plate to permit the entrance of air through the backing plate to travel radially outwardly in the pad 30, as described.

Figure 2:
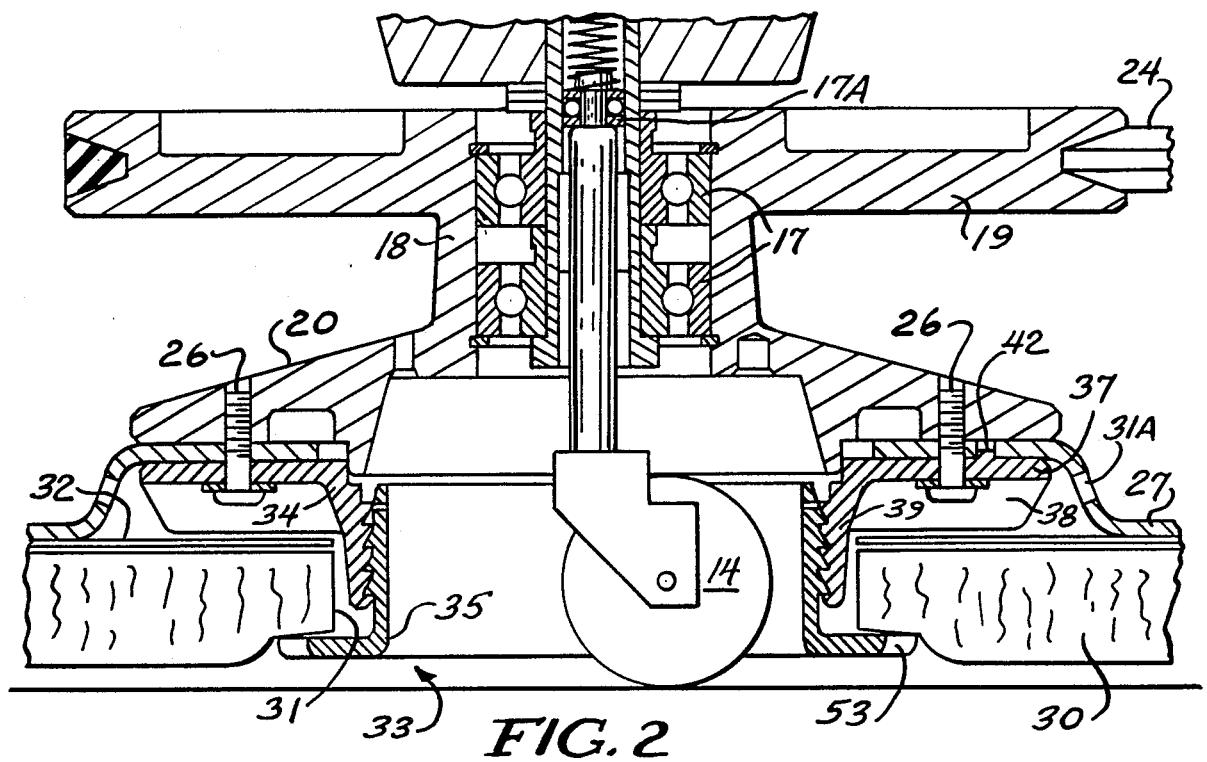
FIG. 2 is an enlarged vertical cross-section similar to FIG. 1, showing the pad holder and center caster in more detail.

The inner peripheral portion of the pad 30 spaced immediately about the central opening 31 is held by a pad holder assembly generally designated 33. As best seen in FIG. 2, the pad holder 33 includes a drive collar 34 and a retainer member 35 which is in the form of a flanged collar.

Figure 3:
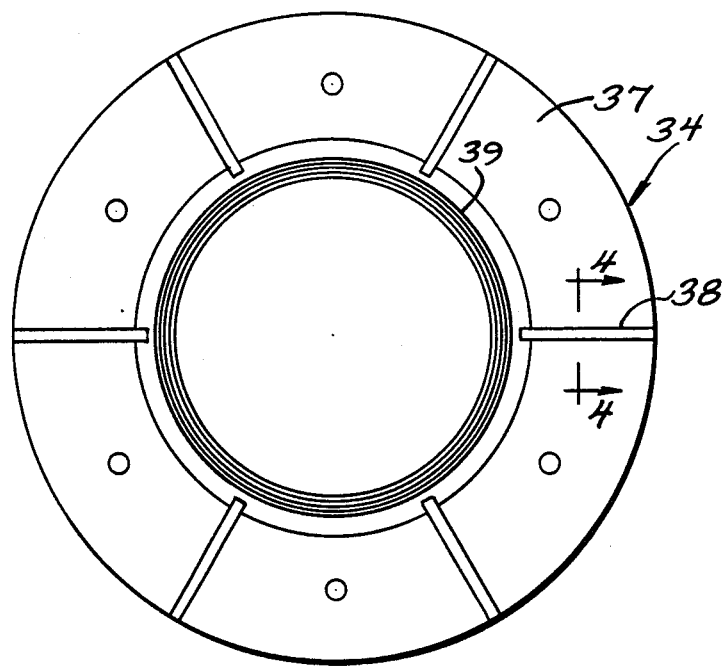
FIG. 3 is a bottom view of the drive collar of the pad holder.
Figure 4:
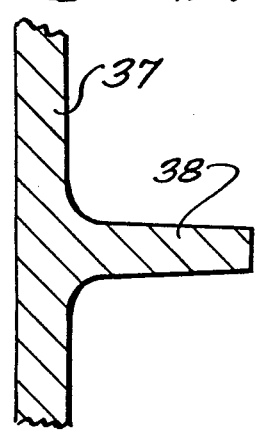
FIG. 4 is a cross-sectional view of one of the ribs of the drive collar of FIG. 3 taken through the site line 4—4 of FIG. 3 with the flange shown in fragmentary form.
Figure 5:
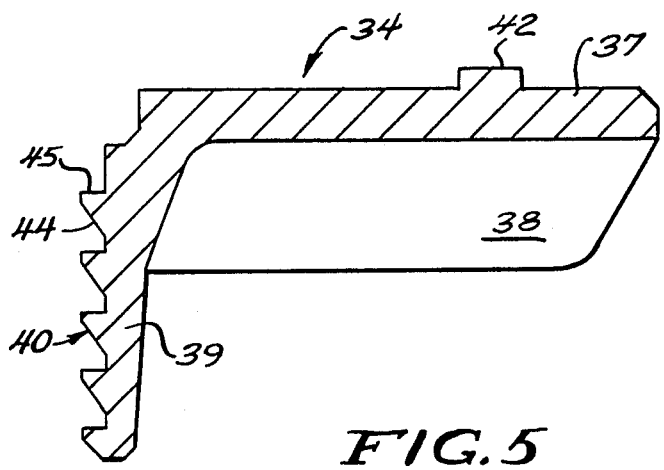
FIG. 5 is an enlarged sectional view of one side of the drive collar showing the internal threads in detail.
Figure 9:
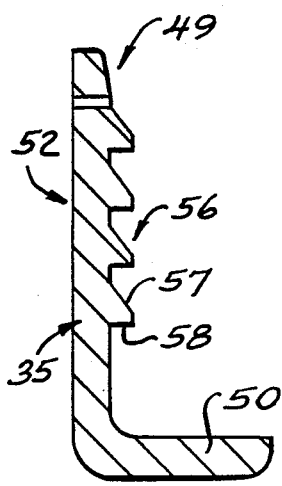
FIG. 9 is an enlarged vertical sectional view of one side of the retainer member.

Referring now to FIGS. 2, 3 and 4, the drive collar 35 includes an outer annular flange 37 which is provided with a series of radially outwardly extending ribs 38 (see FIG. 4) projecting beneath the flange 37, and a cylindrical wall 39 which has internal threads generally designated 40 in FIG. 5. The wall 39 extends downwardly from the flange 37 when the drive collar is assembled to the mounting flange 20 of the casting 18 by the bolts 26. It will be observed from FIG. 2 that the inner portion of the backing member 27 is also mounted to the casting 18 by the bolts 26.

The upper surface of the flange 37 of the drive collar is provided with projections (for example, three) at equal angular spacing, such as the one designated 42 in FIGS. 2 and 5. These projections 42 extend into corresponding apertures in the backing plate 27 to center the backing plate on the drive collar which in turn is center-mounted on casting 18.

Referring now particularly to FIG. 5, the thread on the inner surface of the wall 39 extends continuously in a conventional, helical configuration or pitch. The teeth of thread 40 preferably are in the form of a sawtooth or buttress type of thread. That is, referring to FIG. 5 where the teeth are seen in cross-section or profile, each tooth has a lead-in (or "camming") surface such as that designated 44 in FIG. 5 and a generally flat holding surface or pressure flank 45. The lead-in surface 44 is inclined upwardly and in the direction of insertion of retainer member 35. The holding surface is almost, but not quite perpendicular to the axis of rotation (i.e., the axis of the collar).

Referring now to FIGS. 6-9, retainer member 35 includes an inner cylindrical collar or insert 49 and a peripheral flange 50. The inner surface of the collar 49 is a smooth cylindrical wall with no obstruction extending inwardly which might interfere with the movement of the caster 14 during operation.

The insert 49 is provided with four flex tabs, each generally designated by reference numeral 52 and arranged in quadrature relation to one another. The peripheral portion of flange 50 is provided with finger recesses 53 (FIG. 8), also arranged in quadrature.

Figure 6:
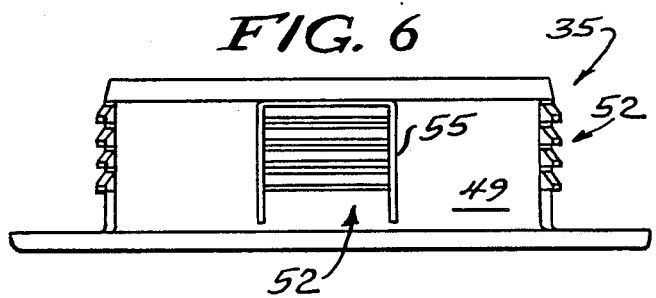
FIG. 6 is a side elevational view of the retainer member of the pad holder.
Figure 7:
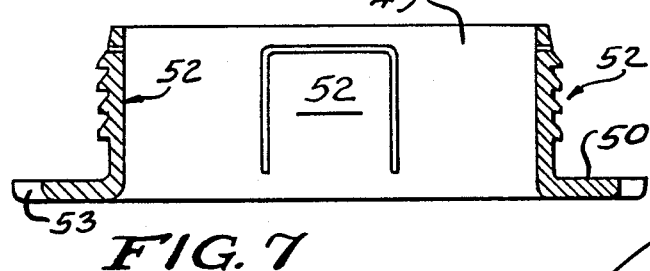
FIG. 7 is a vertical cross-sectional view of the retainer member of FIG. 6 through the site line 7—7 of FIG. 8.
Figure 8:
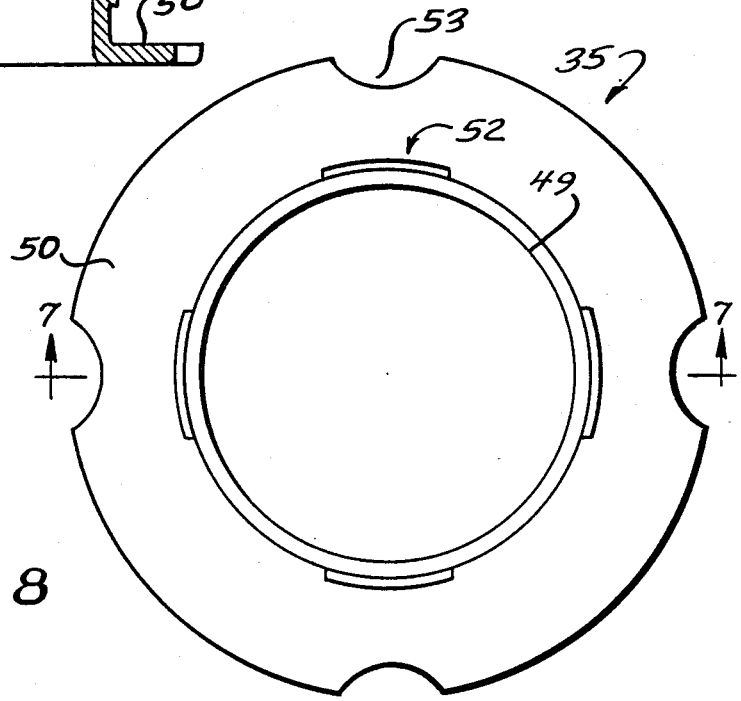
FIG. 8 is a top view of the retainer member of FIG. 6.

Turning now to FIGS. 6 and 7, the flex tabs 52 are rectilinear in outline although they are curved to conform to the shape of wall 49 when viewed from the top. They are defined by a slot 55 which extends around three sides of the flex tab 52, the lower portion of the tab 52 being a continuation of the side wall of insert 49 so that the flex tabs may flex inwardly slightly when so urged.

The outer surface of each of the flex tabs 52 is threaded as at 56. The thread 56 are segments of a continuous helical thread which matches the pitch of the thread 40 on the drive collar. Moreover, the teeth of thread 56 on the flex tabs 52 have a corresponding, matching sawtooth shape or buttress-type profile of the teeth of thread 40. That is to say, each of the teeth of thread 56 has an inclined lead-in surface 57 and a generally flat radially-extending holding surface or pressure flank 58 for engagement with the corresponding holding surface 45 of the teeth of thread 40 on the drive collar 34.

The operation of the pad holder assembly will be clear to persons skilled in the art. However, to briefly review the operation, the drive collar 34 is rigidly attached to the mounting flange 20 and is driven with the casting 18 by the motor 11 and sheaves 23 and 24. The backing plate 24, gripper member 32 and pad 30 are similarly driven. To assemble a pad to the drive collar 34, a pad 30 is placed with its central aperture 31 over the outer smooth surface of the collar 39; and the insert 49 is aligned with the drive collar 34. The retainer member 35 is then pushed inwardly using hand force. The inclined lead-in surfaces 44 of the drive collar are rigid, and they engage the corresponding lead-in surfaces 57 on the flex tabs 52 so that the flex tabs are cammed inwardly as the retainer is inserted into the drive collar; and the tabs of the retainer member 35 are ratcheted over the threads of the drive collar 34. There is no need to match the location of the thread segments on the flex tabs 52 with any radial position on the driven collar 34. Further, the insertion action will accommodate pads of any thickness within a fairly wide range because of the relatively fine pitch of the teeth. The retainer member may be inserted until the flange 50 on the retainer member engages and depresses the inner peripheral portion of the pad about the aperture 31. The application of hand pressure to the flange 50 will normally provide a satisfactory initial gripping force to secure the center of the pad by pressing the pad against gripper member 32 and the ribs 38 of the drive collar.

If additional gripping pressure is desired or if it is desired to tighten the pad holder after the initial application, the operator may insert his fingers into the recesses 53 and turn the retainer member to tighten it. The retainer member is removed by unscrewing it, again using the finger recesses 53.

Having thus disclosed in detail a preferred embodiment of the invention, persons skilled in the art will be able to modify certain of the structure which has been illustrated and to substitute equivalent elements for those disclosed while continuing to practice the principle of the invention. For example, the drive collar could be formed integrally with casting 18 to obviate the need for flange 37. Similarly, fewer or more than four flex tabs could be used, although four is preferred. It is, therefore, intended that all such modifications and substitutions be covered as they are embraced within the spirit and scope of the appended claims.

We claim:

1. Apparatus for mounting a pad having a central aperture to a drive member of a rotary floor care machine comprising: a cylindrical drive collar rigidly mounted to said drive member and having a continuous thread extending over a plurality of convolutions on the inner surface of said collar, the teeth of said thread having a sawtooth profile including an inclined lead-in surface and a generally flat holding surface extending generally radially of the axis of said collar; and a retainer member having a cylindrical insert adapted to be received in said drive collar and a lower peripheral flange, said insert defining a tab means including at least one tab attached to said retainer along a line and having an outer surface defining a segment of thread with teeth having a sawtooth profile including an inclined lead-in surface and a generally flat holding surface, said thread segment on said tab constructed and arranged for matching threaded engagement with the internal thread on said drive collar, whereby said pad may be mounted by placing said central aperture of said pad over said collar, inserting said insert into said collar and pushing on said flange, thereby causing said tab to ride over the internal thread of said collar until said flange of said retainer member compresses said pad in a region around said central aperture and said holding surfaces of said drive member thread and tab are in engagement.

2. The apparatus of claim 1 wherein said drive member further includes an annular peripheral flange extending outwardly of the top of said collar and further comprising means for mounting said peripheral flange of said drive collar to said drive member of said rotary floor care machine.

3. The apparatus of claim 2 further comprising a plurality of ribs spaced about the bottom side of said peripheral flange of said drive collar and extending radially outwardly from said collar and having a depth sufficient to brace the portion of said pad extending about said central aperture against the tightening of said retainer.

4. The apparatus of claim 1 characterized in that said tab means comprises four of said tabs arranged in quadrature relationship with respect to each other on said cylindrical insert.

* * * * *

UNITED STATES PATENT AND TRADEMARK OFFICE
CERTIFICATE OF CORRECTION

PATENT NO. : 4,888,843
DATED : Dec. 26, 1989
INVENTOR(S) : Ronald J. Smith, Thomas J. Lerch, Rick McLeod It is certified that error appears in the above—identified patent and that said Letters Patent is hereby corrected as shown below:

On the title page:

There should be two additional inventors identified, namely:

Grace D. Labrador, Bolingbrook, IL; and
Gary E. Palmer, Roselle, IL

Signed and Sealed this

Twenty-ninth Day of January, 1991

*Attest:*

HARRY F. MANBECK, JR.

*Attesting Officer*      *Commissioner of Patents and Trademarks*